(12) United States Patent
Tange

(10) Patent No.: US 6,497,425 B1
(45) Date of Patent: Dec. 24, 2002

(54) HEAD BOWL SET OF BICYCLE AND THE LIKE

(76) Inventor: Satoshi Tange, 2-2-3 Nansyo Cho Sakai, Osaka (JP)

( * ) Notice: Subject to any disclaimer, the term of this patent is extended or adjusted under 35 U.S.C. 154(b) by 0 days.

(21) Appl. No.: 09/901,649

(22) Filed: Jul. 11, 2001

(51) Int. Cl.⁷ .............................................. B62K 21/00
(52) U.S. Cl. ..................................... 280/279; 384/538
(58) Field of Search ................................ 280/279, 276; 384/275, 276, 543, 545, 569; D15/143; 403/365, 367, 370, 371; 74/551.1

(56) References Cited

U.S. PATENT DOCUMENTS

| | | | | |
|---|---|---|---|---|
| 3,918,779 A | * | 11/1975 | Halliger et al. | 384/538 |
| 4,303,257 A | * | 12/1981 | Perotti et al. | 280/279 |
| 5,330,220 A | * | 7/1994 | Nagano | 280/279 |
| 5,823,556 A | * | 10/1998 | Chi | 280/279 |
| 5,893,574 A | * | 4/1999 | Campagnolo | 280/279 |
| 5,964,474 A | * | 10/1999 | Chen | 280/279 |
| 6,126,323 A | * | 10/2000 | Tange | 384/545 |
| 2001/0022872 A1 | * | 9/2001 | Marui | 384/545 |
| 2001/0040353 A1 | * | 11/2001 | Campagnolo | 280/279 |
| 2001/0045722 A1 | * | 11/2001 | Marui | 280/279 |

FOREIGN PATENT DOCUMENTS

| DE | 33 32 170 A1 | 4/1985 |
|---|---|---|
| DE | 196 44 968 A1 | 5/1997 |
| DE | 199 29 056 A1 | 6/2000 |

* cited by examiner

*Primary Examiner*—Anne Marie Boehler
*Assistant Examiner*—Daniel Yeagley
(74) *Attorney, Agent, or Firm*—Browdy and Neimark, P.L.L.C.

(57) ABSTRACT

A head bowl set of a bicycle and the like comprises a head tube, a front fork tube put through the head tube for connecting a handlebar support tube with the top end, a locking device disposed at the top end of the front fork tube to press against the handlebar support tube, a lower bowl set and an upper bowl set which are respectively disposed at the top end and the bottom end of the head tube, and a tightening member disposed between the cover member of the upper bowl set and the bearing for providing a pivoting and sliding effect between the front fork tube and the head tube. The tightening member is annular in shape and has a tapered portion, a straight wall and a hooked portion. The head bowl set has advantages of structural stability and easy assembly.

3 Claims, 6 Drawing Sheets

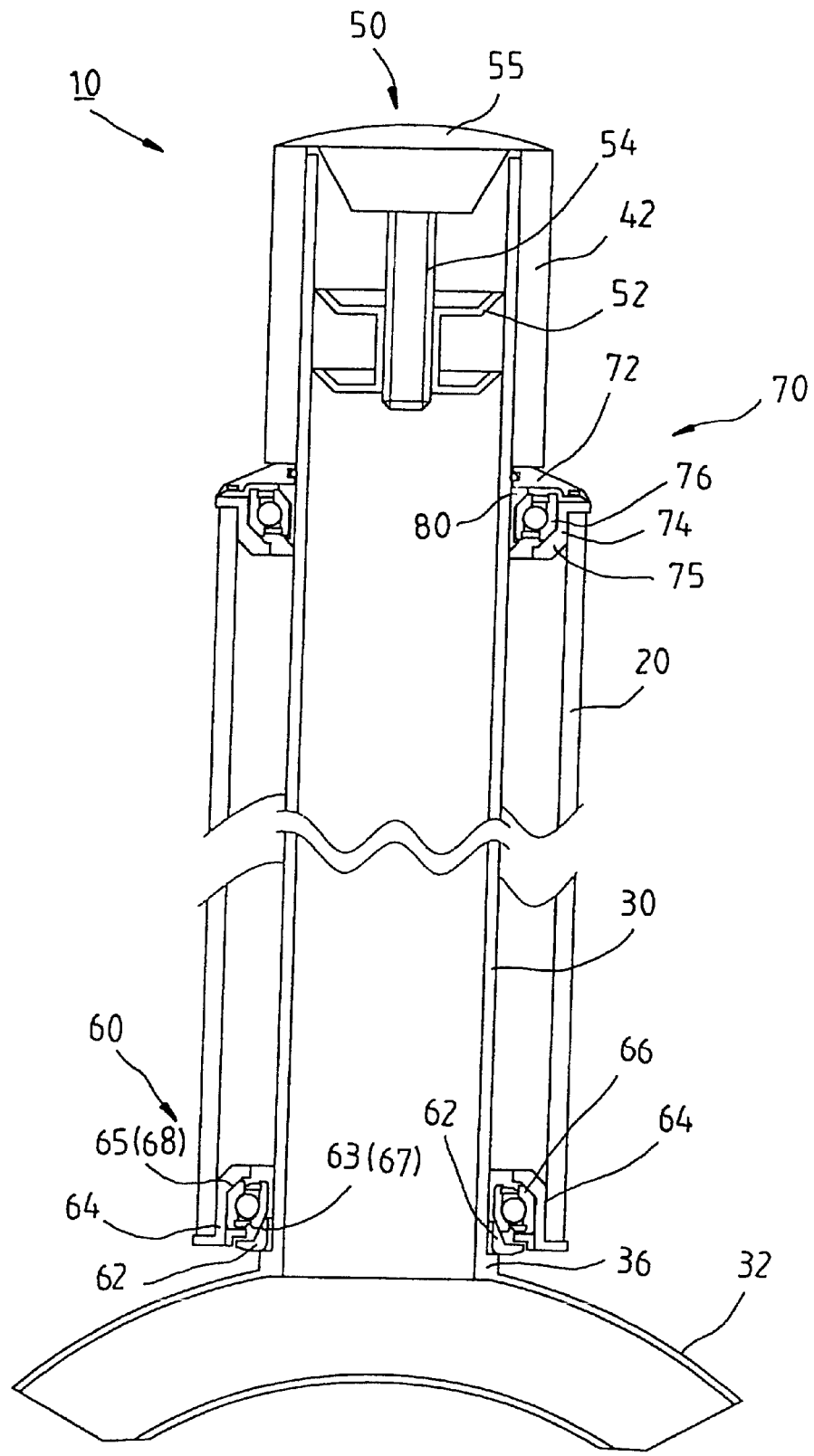
F I G. 4

HEAD BOWL SET OF BICYCLE AND THE LIKE

FIELD OF THE INVENTION

The present invention relates generally to a bicycle frame, and more particularly to a bicycle head bowl set having a stable structure which can be easily assembled.

BACKGROUND OF THE INVENTION

As shown in FIG. 1, a prior art bicycle head bowl set 1 comprises a head tube 2, a front fork 3 put through the head tube 2 such that one end of the front fork is fitted with a handlebar support tube 4, a locking device 5 disposed at the top end of the front fork to press against the handlebar support tube 4, an upper bowl set 6, and a lower bowl set 7 which are respectively disposed at the top end and the bottom end of the head tube 2, and a tightening member 8 disposed between the front fork 3 and the bearing 601 of the upper bowl set 6 such that the tightening member 8 is pressed against by a cover member 602. In light of the tightening member 8 being annular in shape and having a notch, when the tightening member 8 is pressed against by the cover member 602, the tightening member 8 comes in intimate contact with the bearing 601 on one hand. On the other hand, the tightening member 8 and the front fork 3 are clamped securely together, thereby resulting in linkage of the front fork 3 and the inner edge of the bearing 601. As a result, the upper and the lower bowl sets 6 and 7 are fixed at a predetermined position.

In addition to the contact between the inner edge of the tightening member 8 and the front fork 3, the tapered portion 801 of the tightening member 8 is in contact with the tapered surface 603 of the bearing 601. In light of inadequate contact area, the locating effect of the entirety is poor. In the process of replacing the upper bowl set 6, the tightening member 8 must be separated from the bearing 601, thereby resulting in loss of component parts. In addition, the tapered surface 603 of the conventional bearing 601 is designed in various ways in terms of angle. As a result, the consumers are often troubled by the incompatibility of the tightening member 8 with the tapered surface 603 of the bearing 601 which is to be replaced due to damage.

SUMMARY OF THE INVENTION

It is the primary objective of the present invention to provide a bicycle and the like with a head bowl set which has an excellent structural stability.

It is another objective of the present invention to provide a bicycle and the like with a head bowl set which can be replaced and assembled with ease and speed.

The head bowl set of the present invention comprises a head tube, a front fork tube, a locking device, a lower bowl set, an upper bowl set, and a tightening member. The head tube is disposed at the front end of a bicycle frame. The front fork tube is put through the head tube to facilitate the connection of a front fork with a handlebar support tube. The locking device is disposed at the top end of the front fork tube and is formed of a head extending out of the front fork tube to press against the handlebar support tube. The lower bowl set comprises a cover member fitted at the outside of the front fork tube, and a carrying ring disposed at the bottom end of the head tube. There is a gap between the cover member and the carrying ring to accommodate a bearing. The upper bowl set comprises a cover member fitted at the outside of the front fork tube such that the cover member is pressed against by the handlebar tube, and a carrying ring disposed at the top end of the head tube. There is a gap between the cover member and the carrying ring to accommodate a bearing. The bearing is provided at the top end of the inner edge thereof with a tapered surface. The tightening member is annular in shape and is provided with a notch, a tapered portion corresponding to the tapered surface of the upper bowl set bearing, a straight wall extending downward from the tapered portion such that the straight wall is parallel to the inner edge of the bearing, and a hooked portion disposed at the bottom end of the straight wall such that the hooked portion is capable of catching the bottom edge of the bearing. The inner edge of the tightening member is in contact with the outer edge of the front fork tube. As a result, the head bowl set has advantages in design in that its structure is stable, and that its assembly is easy.

BRIEF DESCRIPTION OF THE DRAWINGS

FIG. 4 shows a sectional view of the first preferred embodiment of the present invention.

DETAILED DESCRIPTION OF THE INVENTION

Figure 1:
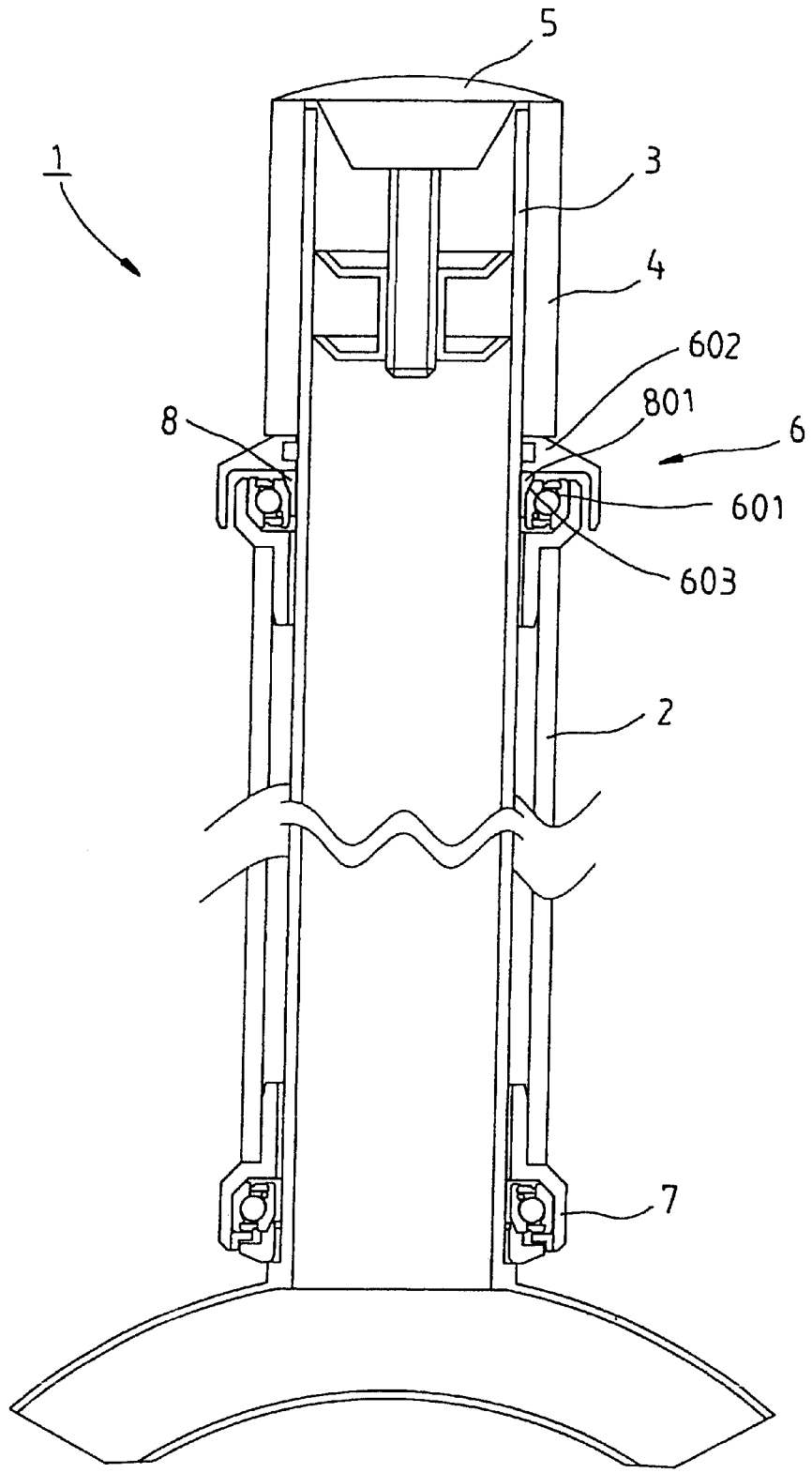
FIG. 1 shows a sectional view of a bicycle head bowl set of the prior art.
Figure 2:
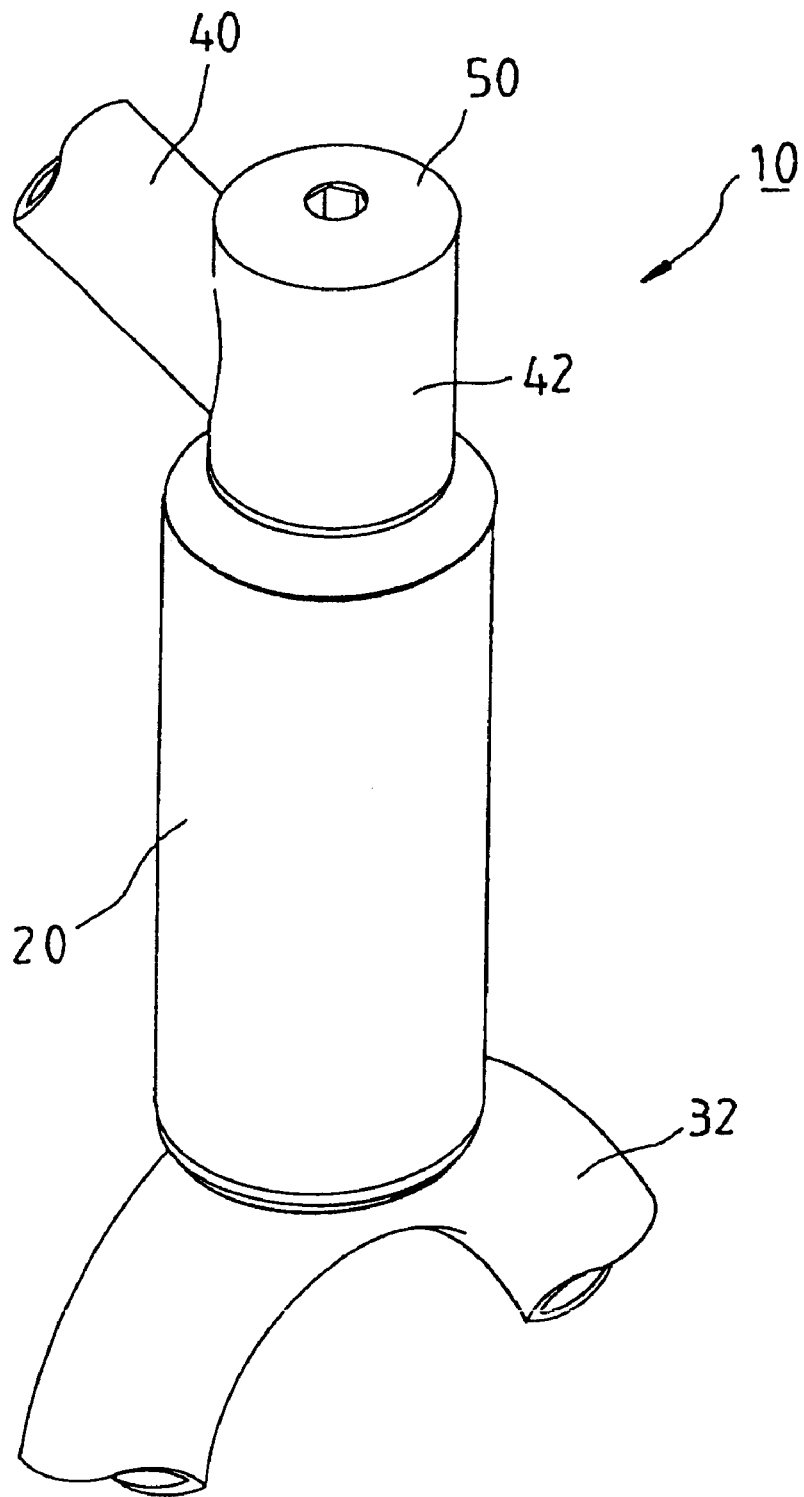
FIG. 2 shows a perspective view of a first preferred embodiment of the present invention.
Figure 3:
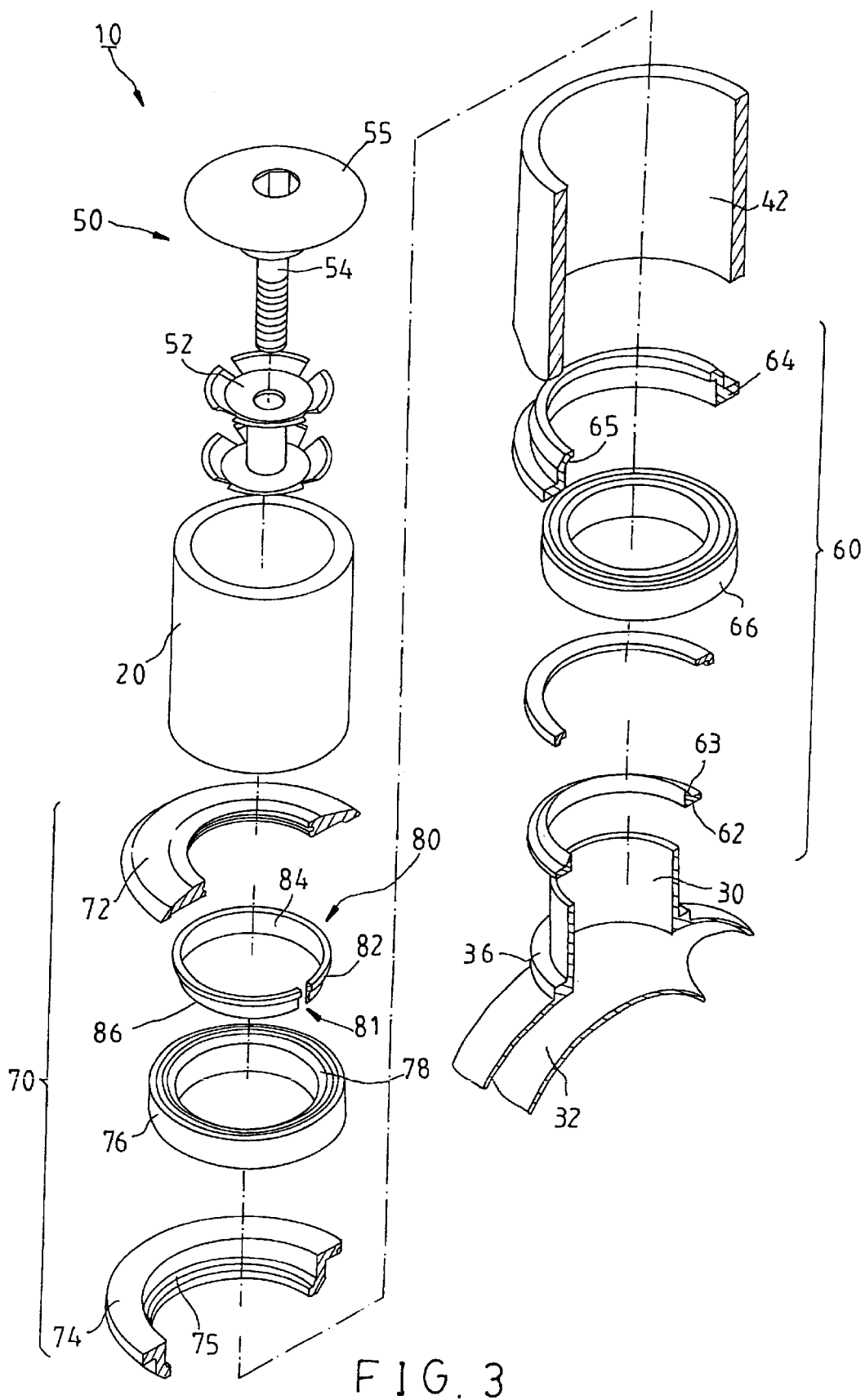
FIG. 3 shows an exploded view of the first preferred embodiment of the present invention.
Figure 5:
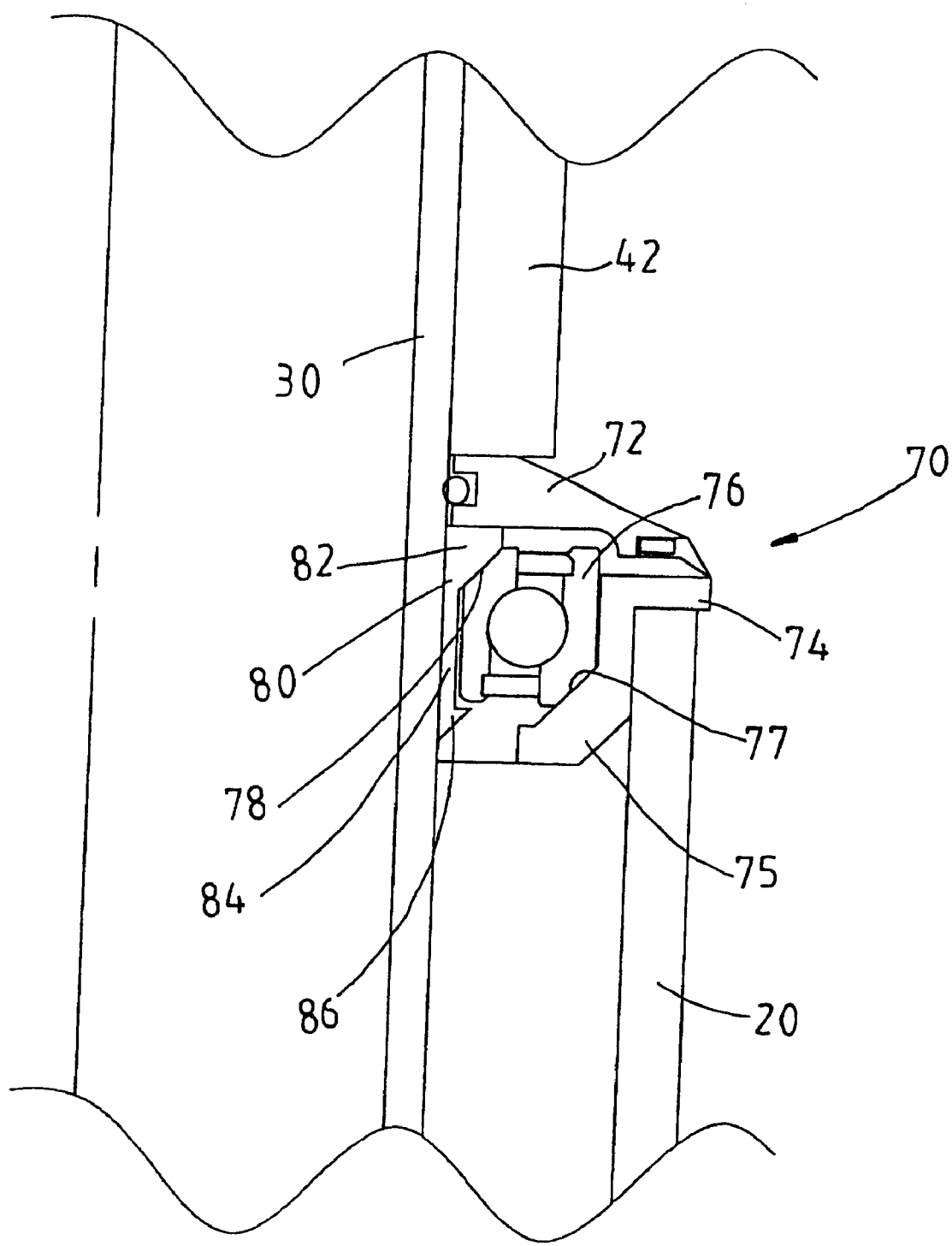
FIG. 5 shows a partial sectional view of the first preferred embodiment of the present invention.

As shown in FIGS. 2–5, a head bowl set 10 of a bicycle or the like comprises a head tube 20, a front fork tube 30, a handlebar support 40, a locking device 50, a lower bowl set 60, an upper bowl set 70, and a tightening member 80.

The head tube 20 is disposed at the front end of the frame of a bicycle, tricycle or scooter.

The front fork tube 30 is put through the head tube 20 such that the bottom end of the front fork tube 30 is fastened with a front fork 32, and that the top end of the front fork tube 30 is fitted with a handlebar support tube 42 of the handlebar support 40. The front fork tube 30 and the front fork 32 are provided in proximity of a juncture thereof with a protruded edge 36.

The locking device 50 comprises a tightening claw 52 held in proximity of the top end of the inner edge of the front fork tube 30, and a joining bolt 54 which is engaged with the tightening claw 52. The joining bolt 54 has a head 55 extending out of the front fork tube 30 to press against the top end of the handlebar support tube 42. The handlebar support tube 42 is located between the locking device 50 and the upper bowl set 70.

The lower bowl set 60 comprises an annular cover member 62 fitted in the outside of the front fork tube 30 to urge the protruded edge 36, and a carrying ring 64 disposed at the bottom end of the head tube 20. There is a gap between the two for accommodating a bearing 66. The cover member 62 is provided in the outer edge of the top end with a tapered portion 63. The carrying ring 64 is provided in the inner edge with a tapered portion 65. The bearing 66 is provided in the inner edge and the outer edge with a tapered surface 67, 68, which urges respectively the tapered portion 63 of the cover member 62 and the tapered portion 65 of the carrying ring 64. The cover member 62 is rotated along with the front fork tube 30. The carrying ring 64 is linked with the head tube 20. The bearing 66 provides between the two with a pivoting and sliding effect.

In production, the cover member and the carrying ring can be changed in design of angle of the tapered portion thereof in order to cooperate with the bearings or balls of various patterns. This is not the subject matter of the present invention.

The upper bowl set 70 is similar in construction to the lower bowl set 60 and is formed of an annular cover member 72 fitted in the outside of the front fork tube 30 and urged by the bottom end of the handlebar support tube 42, and a carrying ring 74 disposed at the top end of the head tube 20. There is a gap between the two for accommodating a bearing 76. The bearing 76 is provided in the bottom end of the outer edge with a tapered surface 77, which urges a tapered portion 75 of the inner edge of the carrying ring 74. The bearing 76 is provided at the top end of the inner edge with a tapered surface 78.

The tightening member 80 is annular in shape and is provided with a notch 81. The tightening member 80 comprises a tapered portion 82 corresponding to the tapered surface 78 of the bearing 76 of the upper bowl set 70, a straight wall 84 extending downwards from the tapered portion 82 and parallel to the inner edge of the bearing 76, and a hooked portion 86 disposed at the bottom end of the straight wall 84 to hook the bottom edge of the bearing 76.

When the cover member 72 is pressed against by the handlebar support tube 42, the pressure is imparted to the tightening member 80 which is caused to displace downward along the direction of the tapered surface 78 of the bearing 76. In view of the contraction of the notch 81 of the tightening member 80, the diameter of the tightening member 80 becomes smaller to be held between the front fork tube 30 and the inner edge of the bearing 76. As a result, the front fork tube 30 turns along with the handlebar support tube 42, the cover member 72 and the tightening member 80. The carrying ring 74 and the head tube 20 are linked. The bearing 76 provides between the two with a pivoting and sliding effect.

In light of the top of the tapered portion 82 of the tightening member 80 being in intimate contact with the cover member 72, and the outer edge of the tapered portion 82 being in intimate contact with the inner edge of the bearing 76, the inner edge of the tightening member 80 clamps securely the front fork tube 30. The contact area of the entirety is much greater than the prior art structure. The structure of the present invention has an excellent stability. The tightening member 80 depends on the hooked portion 86 to join with the bearing 76. In production, the tightening member 80 and the bearing 76 may be first joined together before being placed between the cover member 72 and the carrying ring 74. The assembly is done with ease and speed. In addition, the tightening member 80 and the bearing 76 may be joined together in the warehouse, so as to be ready for use immediately to replace the damaged bearing, without the incompatibility problem of the conventional structures. The user of the present invention may assemble the upper bowl set 70 in a do-it-yourself manner, without the trouble of the loss of component parts.

Figure 6:
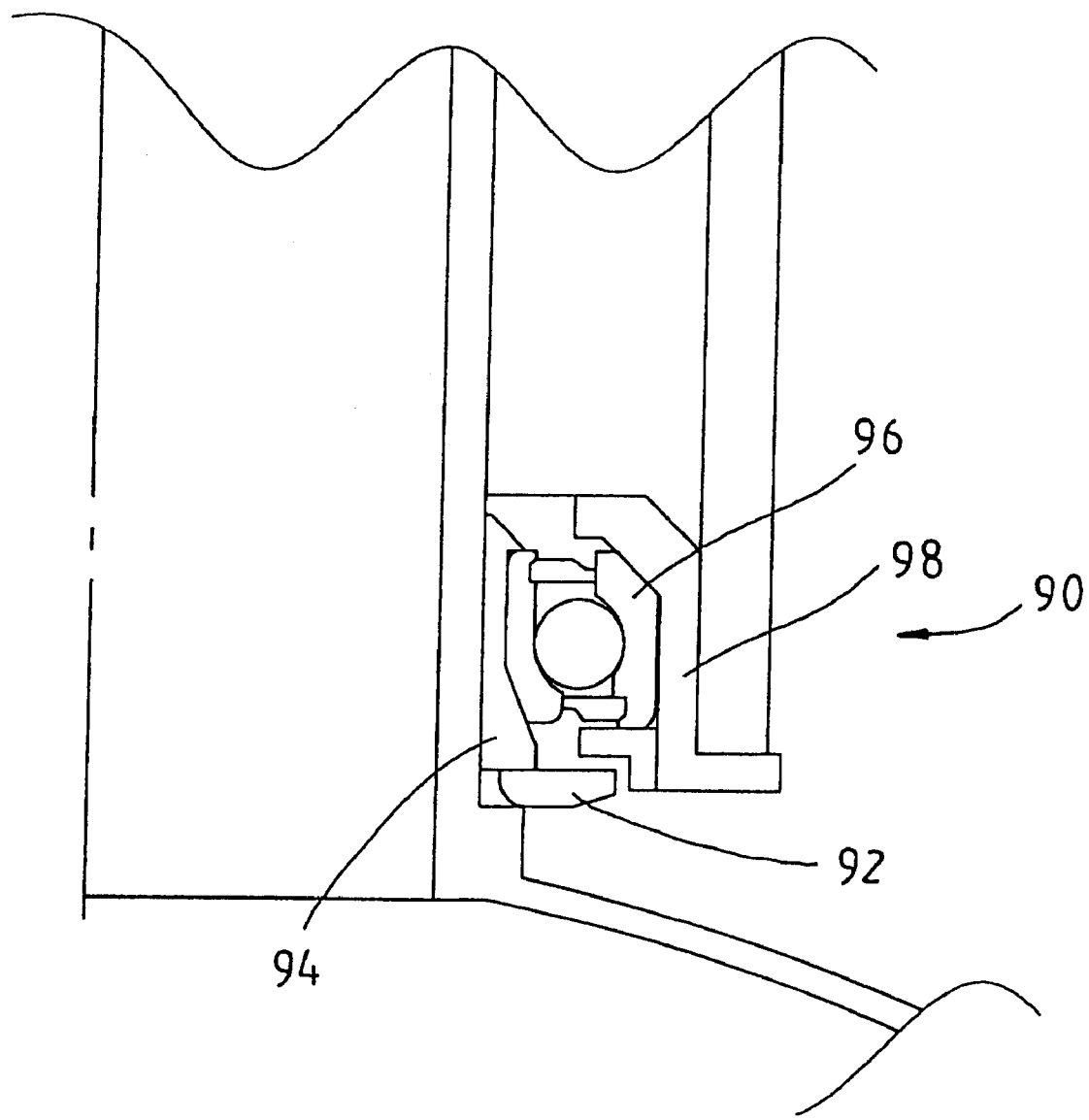
FIG. 6 shows a partial sectional view of a second preferred embodiment of the present invention.

It must be noted here that the tightening member is not necessarily disposed in the upper bowl set, and that the tightening member may be disposed in the lower bowl set to meet various needs. The entire structures are similar, with the only difference being the directions which are opposite to each other, as shown in FIG. 6 in which the second preferred embodiment of the present invention is shown to comprise a lower bowl set 90 which is formed of a cover member 92, a tightening member 94, a bearing 96, and a carrying ring 98. This structure can also serve to attain the objective of the present invention. The upper bowl set and the lower bowl set of the present invention may be provided with the tightening member.

What is claimed is:

1. A head bowl set comprising:

a head tube disposed at a front end of a vehicle frame;

a front fork tube put through said head tube for connecting with a front fork and a handlebar support tube;

a locking device disposed in a top end of said front fork tube, said locking device comprising a head extending out of said front fork tube to press against said handlebar support tube;

a lower bowl set comprising a cover member engaged to an outside surface of said front fork tube, a carrying ring disposed at a bottom end of said head tube, and a gap located therebetween for accommodating a first bearing;

an upper bowl set comprising a cover member engaged to the outside surface of said front fork tube to be pressed against by said handlebar support tube, a carrying ring disposed at a top end of said head tube, and a gap located therebetween for accommodating a second bearing, said second bearing having a tapered surface on an upper end of an inner side thereof; and a first tightening member annular in shape and having a notch, said first tightening member comprising a tapered portion corresponding to said tapered surface of said second bearing, a straight wall extending downward from said tapered portion and parallel to an axis of said second bearing, and a hooked portion disposed on a bottom end of said straight wall capable of hooking a lower end of the inner side of said second bearing, said first tightening member being engaged to the outside surface of said front fork tube.

2. The head bowl set as defined in claim 1, wherein said first bearing has a tapered surface on a lower end of an inner side thereof, said lower head bowl set further comprising a second tightening member annular in shape and having a notch, said second tightening member comprising a tapered portion corresponding to the tapered surface of said first bearing, a straight wall extending upward from said tapered portion and parallel to an axis of said first bearing, and a hooked portion disposed at a top of said straight wall of the second tightening member and capable of hooking an upper end of said first bearing, an inner side of said second tightening member being engaged to the outside surface of said front fork tube.

3. A head bowl set comprising:

a head tube disposed at the front end of a vehicle frame;

a front fork tube put through said head tube for connecting with a front fork and a handlebar support tube;

a locking device disposed at a top end of said front fork tube, said locking device comprising a head extending out of said front fork tube to press against said handlebar support tube;

a lower bowl set comprising a cover member engaged to an outside surface of said front fork tube, a carrying ring disposed at a bottom end of said head tube, and a gap located therebetween for accommodating a first bearing, said first bearing having a tapered surface on a lower end of an inner side thereof;

an upper bowl set comprising a cover member engaged to an outside surface of said front fork tube to be pressed against by said handlebar support tube, a carrying ring disposed at a top end of said head tube, and a gap located between said cover member and said carrying ring for accommodating a second bearing; and a tightening member annular in shape and having a notch, said tightening member comprising a tapered portion corresponding to the tapered surface of said first bearing, a straight wall extending upward from said tapered portion and parallel to an axis of said first bearing, and a hooked portion disposed at a top end of said straight wall and capable of hooking a top end of said first bearing, an inner side of said tightening member being engaged to the outside surface of said front fork tube.

* * * * *